UNITED STATES PATENT OFFICE.

WILLIAM N. CARROLL AND JULIUS C. GRIFFIN, OF NASHVILLE, TENNESSEE.

SPRING-WHEEL.

1,031,687.   Specification of Letters Patent.   Patented July 9, 1912.

Application filed April 25, 1911. Serial No. 623,286.

*To all whom it may concern:*

Be it known that we, WILLIAM N. CARROLL and JULIUS C. GRIFFIN, citizens of the United States, residing at Nashville, in the county of Davidson and State of Tennessee, have invented certain new and useful Improvements in Spring-Wheels, of which the following is a specification.

It is the object of the present invention to provide an improved vehicle wheel of that type in which spring spokes constitute the cushioning elements of the wheel, and the invention aims primarily to disclose a novel means for securing the spokes at their outer ends, to the felly of the wheel, whereby they will not be liable to be broken at their point of attachment to the felly, and splitting of the felly will be prevented.

The spokes of the wheel are in the form of bowed springs, and it is a further aim of the invention to provide means for preventing bowing of the spokes to such degree as would render them liable to snap.

For a full understanding of the invention reference is to be had to the following description and accompanying drawing, in which:—

Figure 1 is a view in side elevation of a vehicle wheel constructed in accordance with the present invention. Fig. 2 is a detail transverse sectional view on the line 2—2 of Fig. 1. Fig. 3 is a detail perspective view of a portion of one of the spokes of the wheel.

Corresponding and like parts are referred to in the following description and indicated in all the views of the accompanying drawing by the same reference characters.

In the drawing, the numeral 1 indicates the hub of a wheel which may be of any ordinary form, and 2 the felly of the wheel to which is secured a metallic tire 3 formed with anti-skidding studs 4.

Each spoke of the wheel consists of spring leaves, disposed in overlapped relation and normally bowed, as shown in Fig. 1 of the drawing. Each of these spring leaves is tapered from its inner to its outer end, and the leaves are of different lengths, that is, the leaves, in the instance of each spoke, are successively shorter. The longest leaf of each spoke, indicated by the numeral 5, is secured at its inner end to the hub 1, and at its outer end, in a manner to be presently explained, to the felly 2. The next longest leaf, indicated by the numeral 6, is also secured at its inner end to the hub 1 and is provided at its outer end with an integral cuff 7 which slidably fits over the leaf 5 near the outer end thereof. The shortest one of the leaves, indicated by the numeral 8, is also secured at its inner end to the hub and provided at its outer end with an integral cuff 9 which fits over the two leaves 5 and 6 in the manner clearly shown in Figs. 1 and 3 of the drawing.

The manner in which the inner ends of the leaves of the spokes are secured to the hub 1 is immaterial, it being observed that the longest one of the leaves is the only one which is secured to the felly 2. When the spokes are placed under compression, the cuff 7 will have a slight sliding play upon the leaf 5 and the cuff 9 will in a like manner have similar movement upon the leaves 5 and 6. When the spoke is compressed to such degree as would render it liable to snap, the cuffs 7 and 9 will bind upon the leaf 5 and leaves 5 and 6, respectively, and a greater resistance will be offered to the compressive force imposed upon the wheel. In securing the outer ends of the leaves 5 of the spokes to the felly 2, there are provided U-shaped clips, the connecting portions of which are indicated by the numeral 10 and the side portions by the numeral 11. The clips are disposed, as clearly shown in Fig. 2 of the drawing, straddling the outer end of each leaf 5, and the felly 2, and a bolt 12 is secured through the felly, the outer end of the said leaf 5, and the connecting portion 10 of the respective clip, the side portions 11 of the clips resting against the sides of the felly, although not directly attached thereto.

It will be readily understood that the clips serve effectually to prevent breakage of the spoke leaves 5 at the point of the passage of the bolts 12 therethrough, and that by reason of the fact that the clips straddle the felly, the felly is prevented from splitting at these points. Also, due to the fact that the side portions of the clips are not secured to the felly by bolts or like securing elements passing through the side portions of the clips and into the felly, weakening of the felly at the points of the attachment of the clips is obviated, the bolts 12 serving to strengthen the felly rather than weaken it.

F. H. CHASE.
CULTIVATOR RAKE.
APPLICATION FILED MAY 31, 1910.
1,031,688.
Patented July 9, 1912.
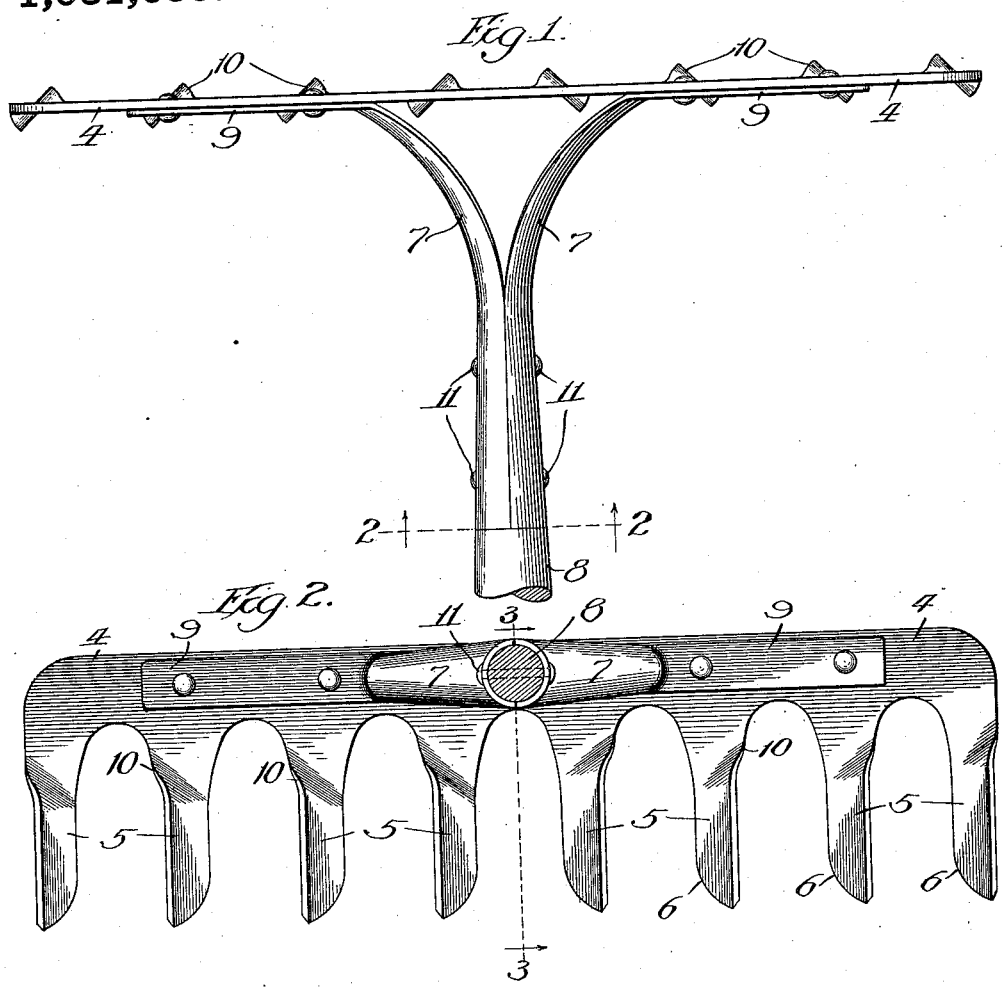
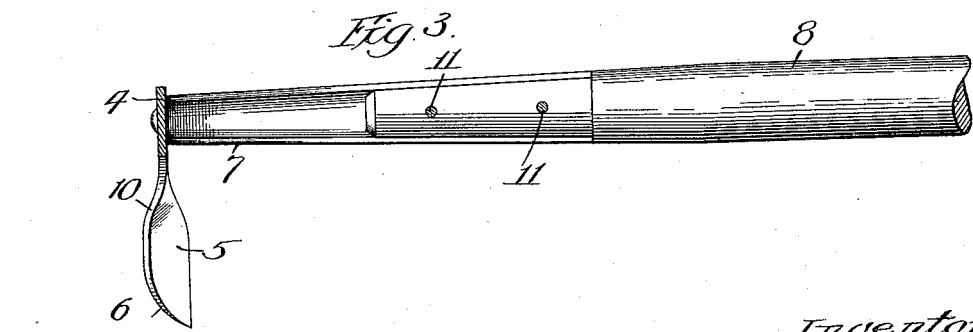
Witnesses:
Geo. C. Davison
J. J. Wilson
Inventor:
Frank H. Chase,
By Linthicum Belt + Fuller
Attys.